(12) United States Patent
Kim et al.

(10) Patent No.: US 8,055,678 B2
(45) Date of Patent: Nov. 8, 2011

(54) QUERY PROCESSING SYSTEM AND METHOD FOR DATABASE WITH ENCRYPTED COLUMN BY QUERY ENCRYPTION TRANSFORMATION

(75) Inventors: Duk Soo Kim, Seoul (KR); Jin Hyuk Jung, Seoul (KR); Eui Seok Kim, Seoul (KR)

(73) Assignee: Penta Security Systems, Inc. (KR)

( * ) Notice: Subject to any disclaimer, the term of this patent is extended or adjusted under 35 U.S.C. 154(b) by 544 days.

(21) Appl. No.: 12/251,874

(22) Filed: Oct. 15, 2008

(65) Prior Publication Data

US 2009/0100033 A1 Apr. 16, 2009

(51) Int. Cl.
*G06F 17/30* (2006.01)
(52) U.S. Cl. ......... 707/781; 707/783; 713/151; 713/153
(58) Field of Classification Search .................. 707/781, 707/783, 999.101, 999.1; 713/151, 153
See application file for complete search history.

(56) References Cited

U.S. PATENT DOCUMENTS

| | | | | |
|---|---|---|---|---|
| 5,956,400 | A * | 9/1999 | Chaum et al. | 713/167 |
| 6,792,425 | B2 * | 9/2004 | Yagawa et al. | 1/1 |
| 7,159,115 | B2 * | 1/2007 | Fujisaki et al. | 713/171 |
| 7,395,437 | B2 * | 7/2008 | Agrawal et al. | 713/193 |
| 7,558,970 | B2 * | 7/2009 | Bellovin et al. | 713/193 |
| 7,743,069 | B2 * | 6/2010 | Chitkara et al. | 707/781 |
| 7,797,342 | B2 * | 9/2010 | Banks et al. | 707/783 |
| 7,869,592 | B2 * | 1/2011 | Fujisaki et al. | 380/28 |
| 7,920,699 | B2 * | 4/2011 | Fujisaki et al. | 380/28 |
| 2006/0294391 | A1 * | 12/2006 | Wu | 713/182 |
| 2007/0294338 | A1 * | 12/2007 | Nishizawa et al. | 709/203 |

* cited by examiner

*Primary Examiner* — John R. Cottingham
*Assistant Examiner* — Noosha Arjomandi
(74) *Attorney, Agent, or Firm* — Hershkovitz & Associates, LLC; Abraham Hershkovitz (57) ABSTRACT

Query processing system and method by query transformation transform a user request query based on an original DB structure, destined to a DBMS of a DB with some columns encrypted, into a query based on an encrypted DB structure so that the DBMS processes the query. The query is processed irrespective of whether or not the query includes an encryption-related item, and query-processing performance is remarkably improved.

2 Claims, 8 Drawing Sheets

TABLE: info_encrypt ~ 711

| id | Age_sec |
|---|---|
| JONES | AS28 |
| BLAKE | AS28 |

710 (table), 712 (Age_sec column), 713 (BLAKE row)

FIG. 7A

TABLE: info ~ 721

| id | age |
|---|---|
| JONES | 65 |
| BLAKE | 65 |

720 (table), 722 (age column), 723 (BLAKE row)

QUERY PROCESSING SYSTEM AND METHOD FOR DATABASE WITH ENCRYPTED COLUMN BY QUERY ENCRYPTION TRANSFORMATION

CROSS REFERENCES TO RELATED APPLICATIONS

This application claims priority to Korean Application No. 10-2007-104005, filed Oct. 16, 2007.

FIELD OF THE INVENTION

The present invention relates to query processing system and method by query transformation, in which encrypted query processing performance is significantly improved by transforming a user request query based on an original database structure (i.e., database structure before encryption), destined to a management system of a database with some columns encrypted, into a query based on an encrypted database structure.

DESCRIPTION OF THE RELATED ART

Figure 1:
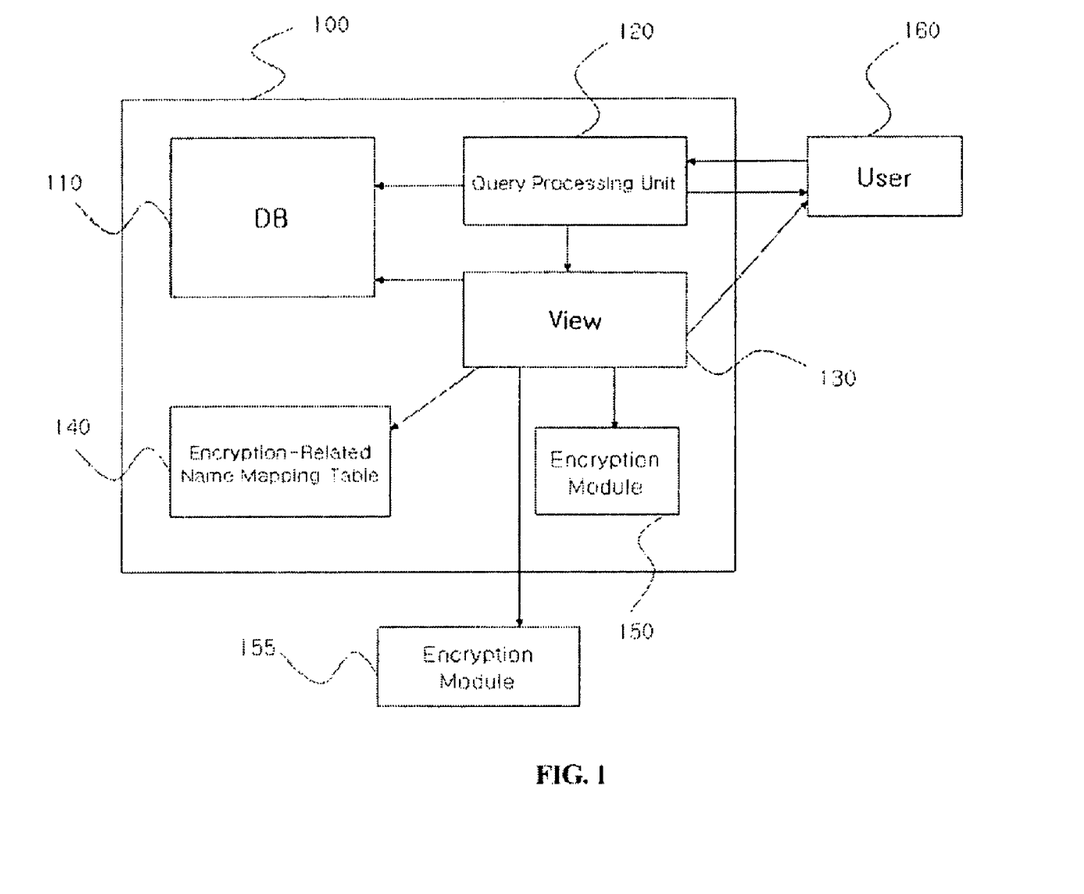
FIG. 1 is a block diagram illustrating the architecture of a conventional DBMS that can encrypt some columns.

FIG. 1 is a block diagram illustrating the architecture of a conventional database management system (DBMS) that can encrypt some columns. As shown in FIG. 1, the DBMS 100 capable of encrypting some database columns includes a database (DB) 110, a query processing unit 120, a view 130 and an encryption module 150. When a user 160 requests a query on a DB, the query processing unit 120 extracts a result by referring to a table of the DB corresponding to the query and transmits a result value to the user 160 (or stores, in the DB, a virtual table for representing the result to the user or a generated table and returns the table). These are functions of a typical DBMS. Referencing a table having an encrypted column in the request query or a field value of the same column is processed by the view 130 since this processes an encrypted table. The view 130 is to specially manage a table, in which some columns are encrypted, and helps a user understand an encrypted table structure by showing the original table structure (i.e., the table structure before encryption). When the user makes a request by composing a query based on such a structure, the view 130 analyzes and processes the query. The view can be understood as a sort of window that shows the original table of the encrypted table. The view uses the encryption module 150 for encryption and decryption of field values. While the encryption module 150 is internally provided, the conventional DBMS 100 can also call an external encryption module 155 by referencing. However, referencing the external encryption module 155 increases system complexity and slows down performance.

Figure 2A:
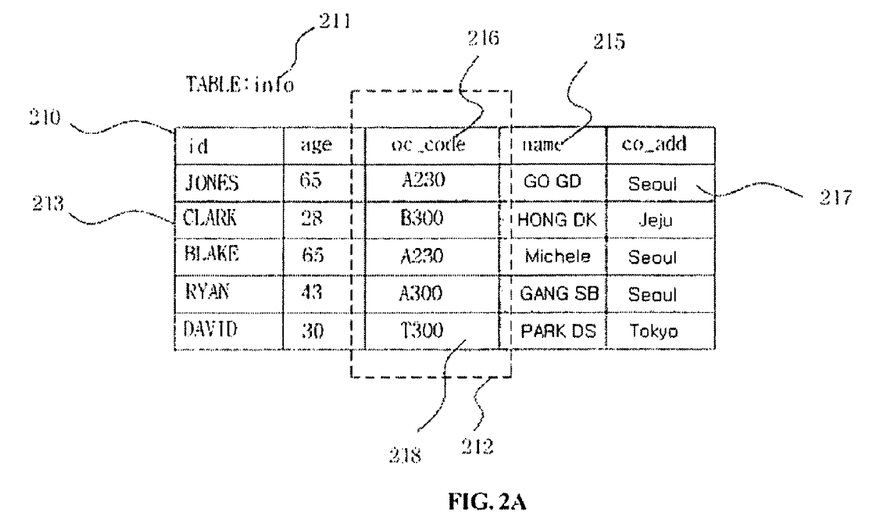
FIGS. 2A and 2B are schematic views illustrating a table generating process when DB column encryption is performed by a view.
Figure 2B:
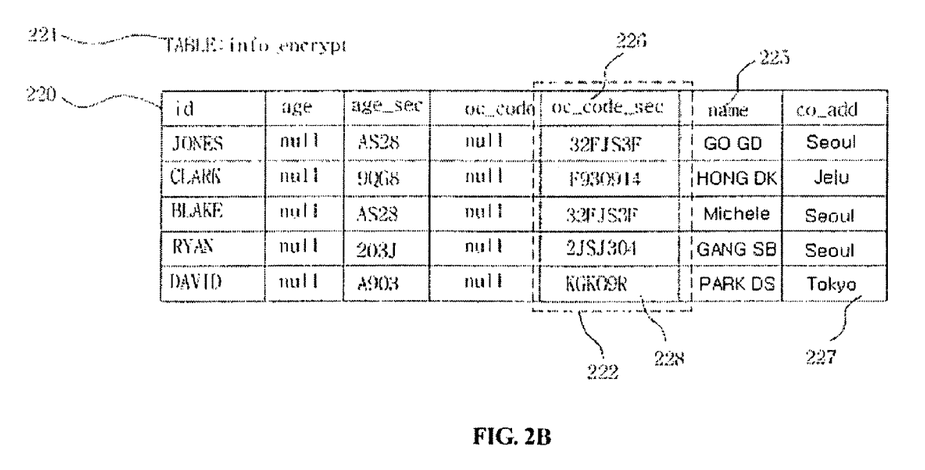

FIGS. 2A and 2B are schematic views illustrating a table generating process when DB column encryption is performed by a view.

The DB column encryption is performed to only some columns in the table, which are required to be encrypted. Zero (0) to all of the columns can be encrypted. For the column encryption, a table identical with an original table 210 (not encrypted) is generated, and then an encrypted column 222 corresponding to a column to be encrypted is added to the generated table.

This table becomes an encrypted table 220. The encrypted table 220 is named in relation with the name of the original table 210 according to specific rules of nomenclature. Since the tables are named by one-to-one mapping, when the name of one table is known, the name of the other table can also be acquired based on the rules of nomenclature. An encrypted field name 226 related to the newly-added encrypted column 222 is determined by a field name 216 of the original table 210, and is composed according to the specific rules of nomenclature, so that a field name can be acquired when its matching field name is known. The table names and the field names are managed by storing the original and encrypted names thereof in an encryption-related name mapping table 140. A name existing in the name mapping table 140 indicates that encryption was performed, and its matching name can also be acquired by mapping.

When the encrypted column 222 is composed, all field values 218 in the original column 212 are encrypted and are then inputted into the encrypted column 222. All the field values of field names corresponding to original field names (prior to encryption) of the encrypted table 220 are nulled. Field values are encrypted by a one-to-one mapping encryption/decryption (algorithm). Since the encryption is based on the one-to-one mapping encryption/decryption, the original record field values 218 can be restored by decrypting only the encrypted field values 228.

Examples of FIGS. 2A and 2B will be described in more detail. FIG. 2A shows the original table, which is not encrypted yet, and FIG. 2B shows the encrypted table. The encrypted table "info_encrypt" is composed from the original table "info," and the encrypted column "oc_code_sec" corresponding to the column "oc_code" subject to encryption is composed. All field values having a field name corresponding to "oc_code" are encrypted and inputted to the column "oc_code_sec." The column "oc_code" subject to the encryption is nulled. In addition, the encryption-related name mapping table 140 stores the table name "info" newly composed in relation to encryption and the field names "age" and "oc_code" of the columns related to encryption, particularly, by pairing each original name with its encrypted name.

When a table with some columns encrypted is composed, encryption/decryption triggers relating to the table are created for each of records. In a typical DBMS, a trigger is a procedure that is automatically run when a record is updated in or inserted into a table. The encryption/decryption trigger is a trigger that is created to automatically enable encryption/decryption of a corresponding field value. In conventional methods using the view, the encryption/decryption of the field values is carried out using the triggers. As a result, it causes encryption/decryption to be excessively performed in a collective process.

Figure 3:
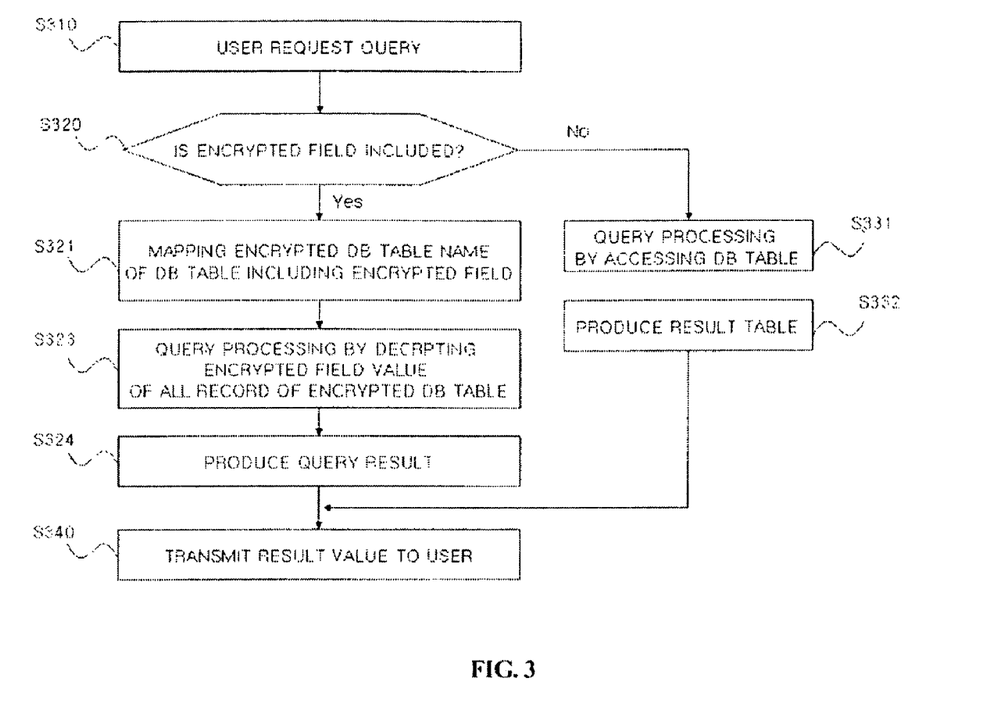
FIG. 3 is a flowchart illustrating a method of processing a query related to encryption using a conventional view.

FIG. 3 is a flowchart illustrating a method of processing a query related to encryption using a conventional view. A user composes a query based on an original table structure (not encrypted) provided from the view 130. That is, the user requests a necessary query based on the original table structure (S310). It is determined whether or not a field name or table, which relates to encryption, exists in the user request query (S320). Specifically, the encryption-related name mapping table 140 is referenced, and "YES" indicates that an encryption-related name exists in the table 140. When an encrypted table in the query is not referenced, the query is processed by accessing the table, like a common DB query processing (S331), and a result is produced and a result table is notified to the user (S340). When an encrypted table in the query is referenced, the encrypted table name is found from the name of the original table expressed in the query by referencing the name mapping table 140 (S321). The query is processed by decrypting all field values of the encrypted column of the found encrypted table (S323). For example, when it is wanted to extract a table including only specific records that satisfy predetermined conditions for encrypted field values (which are generally specified in a WHERE sentence that expresses query conditions), field values of all the records are decrypted to check whether or not the field values satisfy the predetermined conditions. Especially, when a conditional expression includes a comparison symbol such as "<" or ">," all the encrypted values have to be decrypted since comparison is not enabled using the encrypted values. Result values ate produced by adding only the records that satisfy the predetermined conditions (S324). The produced result values of the query are transmitted to the user so that the user can see the values (S340). When the user attempts to check result values by typically selecting the table, the view 130 shows the result values in a virtual table through encryption/decryption as described above so that the user can be notified of the original table and the processed result values, expressed in original values before encryption, without knowing the encryption/decryption. The result values may be shown in the virtual table, or a table about the produced result values may be returned after stored in the DB. Due to the decryption of all the records as described above, a query including encrypted field values is processed at a slower rate than other query processes. However, the record insertion or update in a table is carried out by a trigger in the view since it is not required to return the result value. As described above, in the case of record insertion or update, the trigger runs to process the record through encryption/decryption.

The foregoing problems of the conventional system can be regarded as performance degradation that is generally caused by referencing of the encryption modules or decryption of all the records of a table relating to the encryption. As briefly mentioned above, the encryption module can exist not only inside the system but also outside the system. Therefore, it is difficult to collectively manage the encryption modules and it takes a long time to find a suitable encryption module. In addition, an external encryption module costs more than an internal encryption module to use. Although an encryption module runs one process for a very short time, a massive amount of records may cause terrible slowdown. Since all field values of encrypted columns are encrypted/decrypted with respect to all the records, a leverage effect occurs, thereby greatly slowing down the system. For example, when there are three (3) field names of encrypted field values (i.e., a total of three columns of the file values corresponding to field names) and 100,000 records, it is required to perform a total of 3×100,000 times of decryption in order to check all conditions of the field values. Accordingly, the more the field names of the encrypted field values are and the more the records are, the load of the system for checking the conditions may massively increase.

SUMMARY OF THE INVENTION

The present invention has been made to solve the foregoing problems with the background art in which query processing time is delayed due to performance degradation that occurs in a process of decrypting all records having an encrypted field value, and embodiments of the present invention provide user query processing system and method which can remarkably improve the processing performance of an encryption query by receiving a user query in a point upstream of a conventional encryption database management system (DBMS), transforming the user query into a query of an encryption database (DB) structure and forwarding the transformed query to the DBMS.

Embodiments of the invention also provide user query processing system and method which can integrally and equally manage internal and external encryption modules in order to overcome slowdown in query processing caused by management of and referencing to the encryption modules inside/outside the DBMS.

Embodiments of the invention also provide user query processing system and method which can utilize a conventional DBMS without a modification and thus minimize improvement costs by installing a user query processing unit between a user and the DBMS since the DBMS is a commercially available product that is internally provided with such a construction.

Conventional encryption processing system and method using a view provide transparency so that a query result based on an original table can completely correspond to a query result based on an encrypted table. A conventional technology, however, fails to provide transparency in some cases. For example, the DBMS divides a massive amount of tables into a number of partitions and manages the partitions by links. A virtual table processed by the view does not provide perfect transparency since link management of the partitions is not properly carried out. Embodiments of the present invention provide user query processing system and method which can provide perfect transparency.

In an exemplary embodiment of the present invention, there is provided a query processing system by query transformation, which processes a query when a user requests the query based on an original database structure from a database management system managing a database with at least a column encrypted, the system comprising: a name mapping table storing a field name corresponding to a column to be encrypted and a table name including the column in an encryption-related table of the database management system, by pairing an original name and an encrypted name; a packet processing unit for capturing a query that the user requests from the database management system, transmitting a transformed query to the database management system and receiving a result value of the query processed by the database management system; a query transforming unit for analyzing and transforming the query captured by the packet processing unit into a query capable of referencing an encrypted database by converting an encryption-related item using the name mapping table or encrypting the encryption-related item using an encryption processing unit; a result value transforming unit for transforming the result value, processed using the query transformed by the database management system, into a result value corresponding to the original database by converting an encryption-related item therein using the name mapping table or decrypting the encryption-related item using the encryption processing unit; and the encryption processing unit for encrypting an encryption-related item when the query transforming unit calls and decrypting an encryption-related item when the result value transforming unit calls.

In an exemplary embodiment of the query processing system, an item in the query is an encryption-related item when the item is a table name and a field name and exists in the name mapping table or when the item is a constant and a variable of a relation including the item in the query is a field name existing in the name mapping table. An item in the result value is an encryption-related item when the item is a table name and a field name and exists in the name mapping table or when the item is a constant and a variable of a relation including the item in the result value is a field existing in the name mapping table.

In another exemplary embodiment of the query processing system, the query transforming unit performs query transformation, in such a fashion that the transformed query allows referencing to the encrypted database, by converting the table name and the field name into matching names stored in the name mapping table and replacing the constant with a value encrypted by the encryption processing unit. The result value transforming unit transforms the result into the result value corresponding to the original database by converting the table name and the field name into matching names stored in the name mapping table and replacing the constant value into a value decrypted by the encryption processing unit.

In an exemplary embodiment of the query processing system, the packet processing unit determines whether or not an encryption-related item exists in the captured query, calls the query transforming unit to perform query transformation when the encryption-related item exists, and transmits the packet to the database management system when the encryption-related item does not exist.

In another exemplary embodiment of the query processing system, the encryption processing unit is internally provided with a module necessary for encryption/decryption.

In another exemplary embodiment of the present invention, there is provided a query processing method by query transformation when a user requests a query based on an original database structure from a database management system managing a database with at least a column encrypted, the method comprising the steps of: (S510) generating a name mapping table when the database management system generates an encryption-related table, wherein the name mapping table stores a field name corresponding to a column to be encrypted and a table name including the column by pairing an original name and an encrypted name; (S520) capturing a query that the user requests from the database management system; (S530) analyzing and transforming the captured query into a query capable of referencing an encrypted database, by converting an encryption-related item in the query using the name mapping table or by encrypting the encryption-related item using an encryption processing unit; (S540) requesting a query using the transformed query from the database management system and receiving a processed result value therefrom; (S550) transforming the result value, processed using the query transformed in the DBMS 100, into a result value corresponding to the original database by converting an encryption-related item therein using the name mapping table or decrypting the encryption-related item using the encryption processing unit; and (S560) notifying the transformed result value to the user.

In an exemplary embodiment of the query processing method, the step (S530) comprises the steps of: (S531) sequentially reading items in the query; (S532) converting a table name or a field name into an item value corresponding to encryption when an read item is the table name or a field name and relates to encryption; (S534) replacing a constant with an encrypted value when a read item is the constant and a variable of a relation including the constant is the field name related to encryption; and determining whether or not a more item to read exists in the query, returning to the step (S531) when a further item to read exists, and proceeding to the query request step (S540) when no further item to read exists, and wherein the step (S550) comprises the steps of: (S552) converting a table name, received as the result value, using the name mapping table when the table name relates to encryption; and (S554) converting a field name, received as the result value, using the name mapping table, and decrypting all field values corresponding to the field name when the field name relates to encryption.

In another exemplary embodiment of the query processing method, the step (S552) comprises converting an item read from the query into a matching value stored in the name mapping table when the read item is the table name or the file name and exists in the name mapping table, and wherein the step (S552) to the step (S553) comprise converting the table name or the field name, received as the result value, into a matching value stored in the name mapping table when the table name or the field name exists in the name mapping table.

As described above, the conventional query processing system and method using the view, in which a query includes an encryption item, fail to equally manage an encryption module and reference to an external encryption module, thereby causing overall performance degradation. The query processing system and method by query transformation of the present invention can manage and call the encryption module by itself to use resources without sharing with the DBMS, thereby achieving efficient speed. Although a process of encrypting/decrypting one field value may have a small difference in speed between the present invention and the conventional technology, the difference increases when encryption/decryption is performed more. In the case of processing an encryption/decryption-related query, respective values of a column have to be compared in order to determine whether or not the encryption/decryption-related query corresponds to predetermined conditions. Therefore, when a table size is several thousands or several millions, decryption of all records causes the speed difference to be great.

In addition, the conventional query processing method using the view is designed to automatically run an encryption/decryption program such as a trigger automatically runs when records are accessed and thus process unnecessary encryption/decryption in some cases. However, the present invention processes a common query via encryption/decryption procedures on the query itself and thereby prevents the number of the encryption/decryption procedures from exceeding that of the conventional method using the view. The difference between the procedure numbers is most significant when a query command "UPDATE" is run. For example, in the case of attempting to fill an encrypted column with equal values, when a respective field of a column is accessed for update, the conventional method automatically generates a trigger to process encryption/decryption two times the number of records. Conversely, the present invention processes encryption only once in query transformation. Generally, many update queries are composed in the following form: "A predetermined value is updated when predetermined conditions are satisfied." Thus, in many cases, several records are updated at the same time.

Figure 8A:
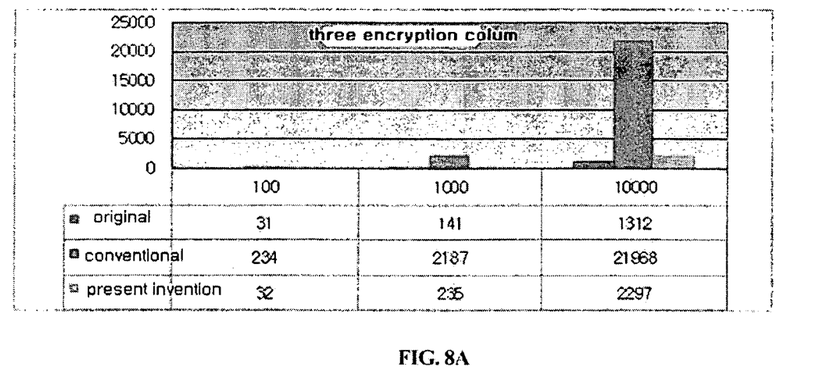
FIG. 8A is a diagram for comparing performance differences when 100, 1000 and 10000 records were processed for encrypted three (3) columns.
Figure 8B:
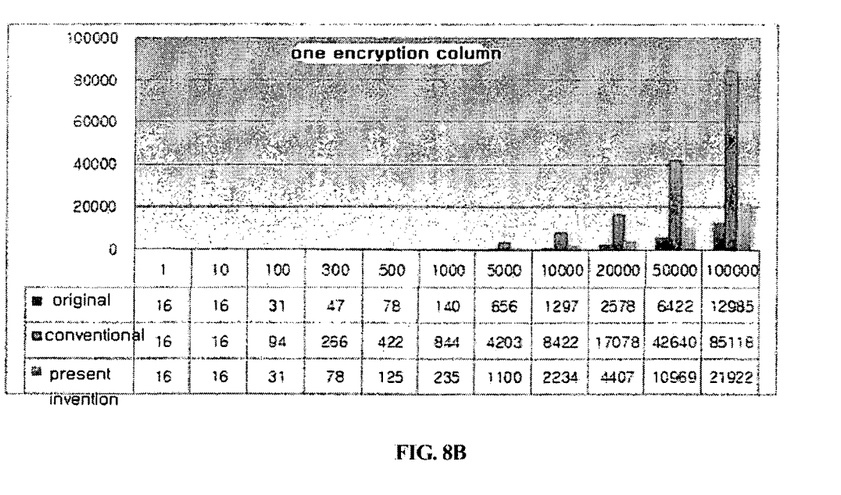
FIG. 8B is a diagram for comparing performance differences when 100000 records were processed for encrypted one (1) column.

Accordingly, the present invention has improved the speed of processing an encryption/decryption function one time and the number of encryption in the encryption/decryption function, so that a remarkable improvement in performance can be achieved as the number of records increases. In more detail, FIGS. 8A and 8B show the performance difference between the conventional technology and the present invention. FIGS. 8A and 8B are performance results, which were achieved by actually testing the conventional technology and the present invention, in which FIG. 8A is a diagram for comparing performance differences when 100, 1000 and 10000 records were processed for encrypted three (3) columns, and FIG. 8B is a diagram for comparing performance differences when 100000 records were processed for encrypted one (1) column. In FIGS. 8A and 8B, the first bar represents a processing speed when encryption was not performed, the second bar represents a processing speed when query processing was performed according to the conventional technology, and the last bar represents a processing speed realized by the invention.

Furthermore, the present invention provides transparency that is at least the same as that of the conventional method using the view. In some specific cases, for example, of dividing a table into a number of partitions and managing the partitions by links, the encryption-related query processing method using the view fails to provide transparency. However, the present invention provides 100% transparency by accessing the encryption table using a transformed query in the same fashion as a common table.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE EXEMPLARY EMBODIMENT

The present invention will now be described more fully hereinafter with reference to the accompanying drawings, in which exemplary embodiments thereof are shown. The ensuing detailed description illustrates exemplary embodiments only, and is not intended to limit the scope, applicability, or configuration of the invention. In the following description, a detailed description of known functions and configurations incorporated herein will be omitted and the configuration of the present invention will be understood without any difficulties by those skilled in the art with the following description with reference to the accompanying drawings.

Figure 4:
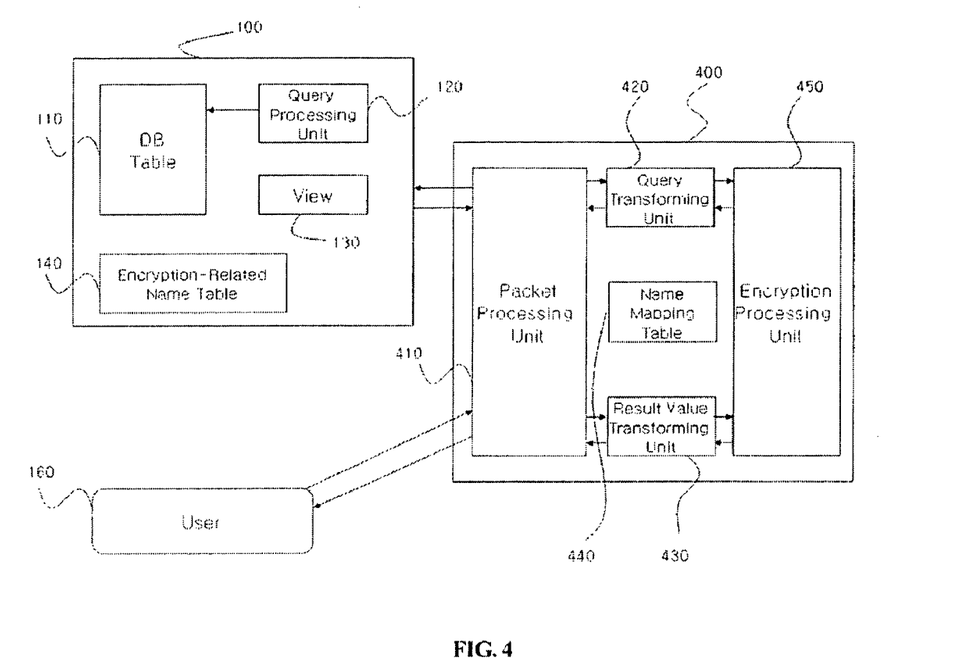
FIG. 4 is a block diagram illustrating an exemplary embodiment of a user query processing system according to the invention.

FIG. 4 is a block diagram illustrating an exemplary embodiment of a query processing system according to the invention.

Referring to FIG. 4, the query processing system by query transformation of the invention includes a packet processing unit 410, a query transforming unit 420, a result value transforming unit 430, a name mapping table 440 and an encryption processing unit 450.

The name mapping table 440 is a table that stores those values read from an encryption-related name table 140 in a database management system (DBMS) 100. Here, the encryption-related name table 140 stores table names and field names related to an encrypted table 220 by pairing each original name with its converted name (i.e., matching name). More specifically, as described above, a field name of a column to be encrypted when the encrypted table 220 is produced and a table name including the column are newly composed according to a certain rule of nomenclature. The original name and the new name composed by the rule of nomenclature are stored and managed as a pair in the encryption-related name mapping table 140. A name existing in the name mapping table 140 indicates that encryption was performed, and its matching name ran also be acquired by mapping. The procedure of changing names based on the name mapping table 440 is referred to as "conversion" and is different from data encryption and decryption methods. That is, the conversion is to replace with the pair stored in the name mapping table 140 and the encryption/decryption is to change by an encryption/decryption method.

The packet processing unit 410 captures (or snaps) a query sent from a user 160 to the DBMS 100, transmits a transformed query to the DBMS, and receives a result value of the transformed query from the DBMS. Since the user 160 generally communicates with the DBMS 100 by networking, the user request query is transmitted in the form of a packet. Hence, the packet processing unit 410 captures and analyzes the packet in practice. When the captured packet is analyzed and an encryption-related item exists in the user request query, the query transforming unit 420 is called to transform the query. Then, the packet processing unit 410 transmits the transformed query, when transformation is required, otherwise the original query to the DBMS 100 so that the DBMS 100 processes the query. In addition, the packet processing unit 410 receives a result of the query processed from the DBMS 100. When the result value has an item related to encryption, the packet processing unit calls the result value transforming unit 430 to transform the encrypted table into the original table. Then, the packet processing unit 410 transmits or notifies the result to the user 160.

The packet processing unit 410 determines an item of the query as being related to encryption by checking whether or not the same item exists in the name mapping table 440. This procedure is similar to a method that will be described later in relation to the query transforming unit, except that the item related to encryption is not converted.

As an alternative, the packet processing unit 410 may call the query transforming unit 420 to process the packet without determining whether or not any item in the query relates to encryption. In order to determine whether or not any item in the query relates to encryption, items in the query are read in sequence. This procedure is the same as a process of the query transforming unit 420, which will be described later. Therefore, the query transforming unit 420 can collectively process this procedure, and when there is no encryption-related item, will return the same query as the original query (i.e., user request query). In the case where no items relate to encryption, the packet processing unit 410 is required to read all items of the query to determine that no items relate to encryption. This costs as much as the query transforming unit 420 processes the same procedure. Therefore, it may be unnecessary for the packet processing unit 410 to determine whether or not encryption was performed.

The query transforming unit 420 transforms a query by converting or encrypting an encryption-related item in the query. The transformed query 620 is sent through the packet processing unit 410 to the DBMS 100, which will then process the transformed query 620.

Figure 6A:
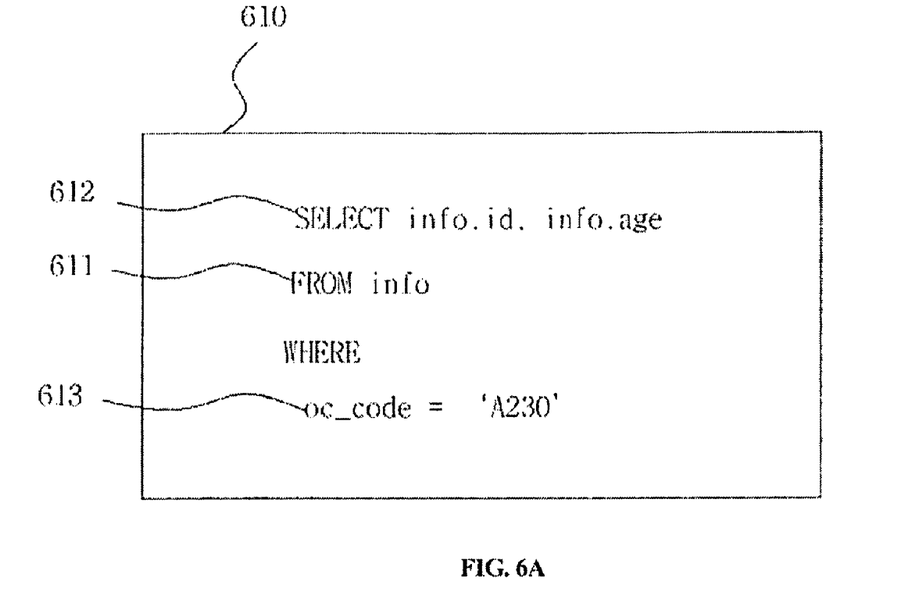
FIGS. 6A and 6B are schematic views illustrating an embodiment of query transformation.
Figure 6B:
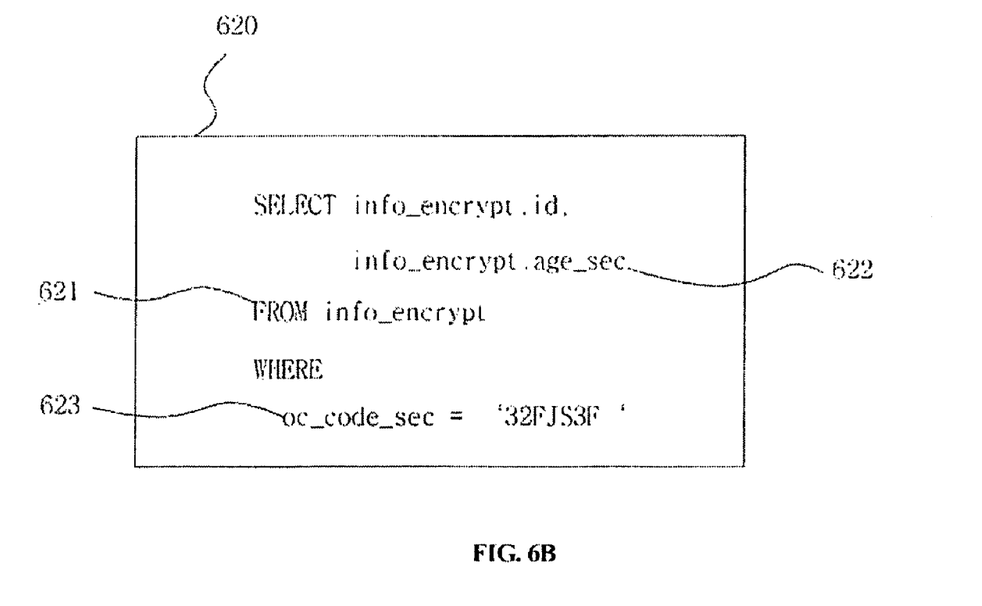

The query transformation will be described with reference to FIGS. 6A and 6B, which show an embodiment of the transformation of a most common command SELECT of a query. FIG. 6A is a user request query, and FIG. 6B is a query transformed from the user request query. The user request query 610 is composed of query commands, such as SELECT, FROM and WHERE, and user items such as a table name 611, a field name 612 and a constant 613. In the query transformation, the user items related to encryption are transformed but the query commands are left intact. In the user items, those items unrelated to encryption are also left intact. Relation to encryption is determined differently according to the types of the user items.

In case of some items in the query such as the table name 611 and the field name 612, relation to encryption is determined based on their existence in the name mapping table 440. A name existing in the name mapping table 440 is determined to be related to encryption. This name has a matching name in the name mapping table 440, and the matching name indicates an encrypted DB. Accordingly, the query is transformed by converting the name into the matching name. For example, as shown in FIGS. 6A and 6B, the table name "info" is converted into its matching name "info_encrypt" since "info" exists in the name mapping table 440 and its encrypted name is "info_encrypt." The field name "age" is converted into its matching name "age_sec" on the same reason.

Now, a description will be given of the constant 613, the remaining item in the query. The encryption-related constant 613 refers to a constant in an equation, which relates to an encryption-related field name. Conditions in the query and so on are unit relations composed to express relationships such as field name to field name and field name to constant. (Some relations are complicatedly composed by including unit relations using brackets.) In the relations expressed by a field name and a constant, a constant of the relation relates to encryption when the field name is related with encryption. As described above, the relation of the field name to encryption is determined based on whether or not the field name exists in the name mapping table 440.

Referring to the example of FIGS. 6A and 6B, a WHERE sentence has a relation oc_code='A230,' in which the constant 613, i.e., 'A230' relates to encryption since the field name "oc_code" relates to encryption. Further, the constant related to encryption is encrypted by the same method that encrypts the field value of the field name of a relation including the constant. In the example of FIGS. 6A and 6B, the constant 613 "A230" is encrypted in the same method that encrypts the field value corresponding to the field name "oc_code." The method of encrypting a constant is the same as the method of encrypting a field value, and can use one-to-one mapping, as the conventional method.

Accordingly, in the transformed query 620, the table name 621, the field name 622 and the constant 623 are converted or encrypted from the encryption-related items of the user query 610 such as the field name 612, the table name 611 and the constant 620. The transformed query 620 is same as a common query since only the user items related to encryption are converted. In addition, the encrypted table and field name have the same construction as common table and field name except for their names. A transformed query request can be sent to the DBMS in the same manner as a common query request, which DBMS also processes the transformed query like a common query. Therefore, the view that specially processes encryption in the encryption DBMS is not used any longer.

A more detailed description will be given of the packet processing unit 410 as described above, which determines whether or not an encryption-related item is included in a query. The encryption-related item is included in the query when the original field name 612 of the encrypted column or the table name 611 including the original column exists in the query.

Returning to FIG. 4, a description will be given of the result value transforming unit 430. The result value transforming unit 430 transforms a result value generated using the transformed query into a result value corresponding to an original DB by converting or decrypting an encryption-related item. The transformed result value is sent or notified to the user 160.

A detailed description will be given of result value transformation with reference to FIGS. 7A and 7B, which show an embodiment in which a result value is transformed to a result value corresponding to an original DB. In a result value 710, encryption-related items are divided into a table name 711, a field name 712 and a field value 713. The table name 711 is an encryption-related item when its result value is returned in a table form and its table name exists in the name mapping table 440. In this case, the table name 711 is transformed to be the same as the matching value in the mapping table 440. The field name 712 is an encryption-related item when its result value is returned in a table form and it exists in the name mapping table 440 after all the field names of the table are checked. In this case, the field name 712 is transformed to be the same as the matching value in the mapping table 440, like the table name. When the field name 712 relates to encryption, i.e., exists in the mapping table 440, all the field values 713 corresponding to the field name relate to encryption. Accordingly, all the field values 713 are encrypted and are replaced by the encrypted values. Like the query transformation, those items unrelated to encryption are not transformed. The table composed as above becomes a result value corresponding to the original DB.

Figure 7A:
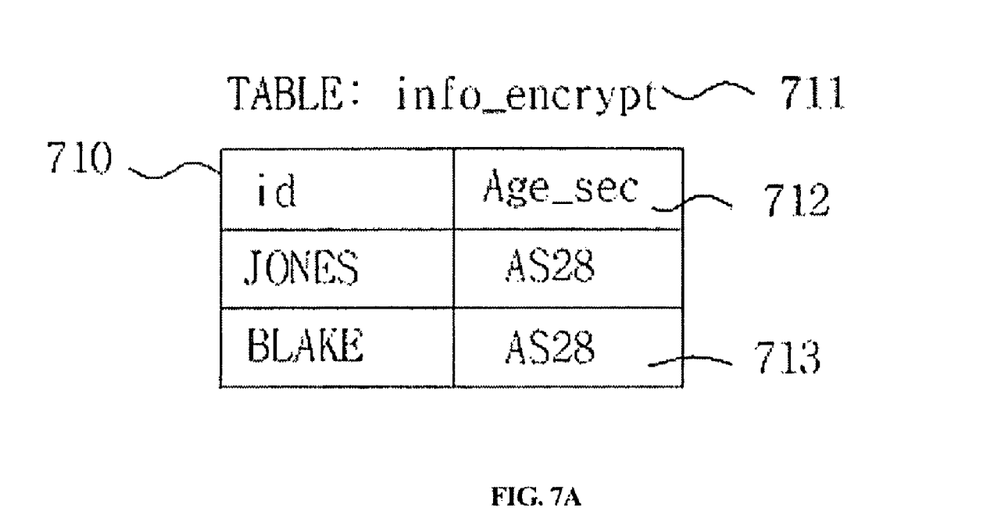
FIGS. 7A and 7B are schematic views illustrating an embodiment of result table transformation.
Figure 7B:
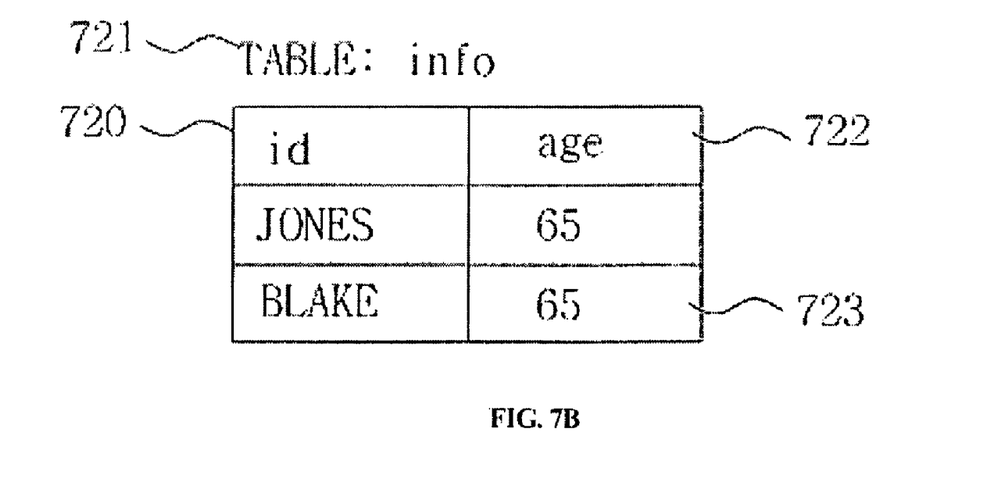

For example, referring to an example of FIGS. 7A and 7B, when the transformed query 620 of FIG. 6B is requested to the DBMS for the encrypted table 220 of FIG. 2B, the result value 710 of FIG. 7A in the form of a table is received. Since the table name 711 "info_encrypt" exists in the name mapping table 440, it is converted into the matching table name 721 "info." Since the field name 712 "age_sec" exists in the name mapping table 440, it is converted into the matching field name "age." In addition "AS28" and "AS28" corresponding to the field name "age" are decrypted into and replaced by 65 and 65, respectively. In this manner, these values are transformed into the result value 720 corresponding to the original DB.

The encryption processing unit 450 encrypts and decrypts field values using an encryption method. The encryption method can extract original field values by decrypting encrypted field values based on a one-to-one mapping encryption algorithm as describe above in the Background Art. The encryption processing unit 450 performs field value encryption by calling the query transforming unit 420 and performs field value decryption by calling the result value transforming unit 430. The query transforming unit 420 collectively and internally manages all encryption modules. This can overcome inconvenience and slowdown caused by the conventional DBMS with the encryption modules internally and externally managed.

While the user query processing system and method by query transformation of the invention sends a query request by query transformation to the DBMS 100 like sending a typical query request, it is not to be understood that the function of the view 403 is completely excluded. The function of the view is used in the process of composing an encryption-related table, and the name mapping table 440 is composed by fetching the values of the encryption-related name table 140, which is composed in the same process.

Figure 5:
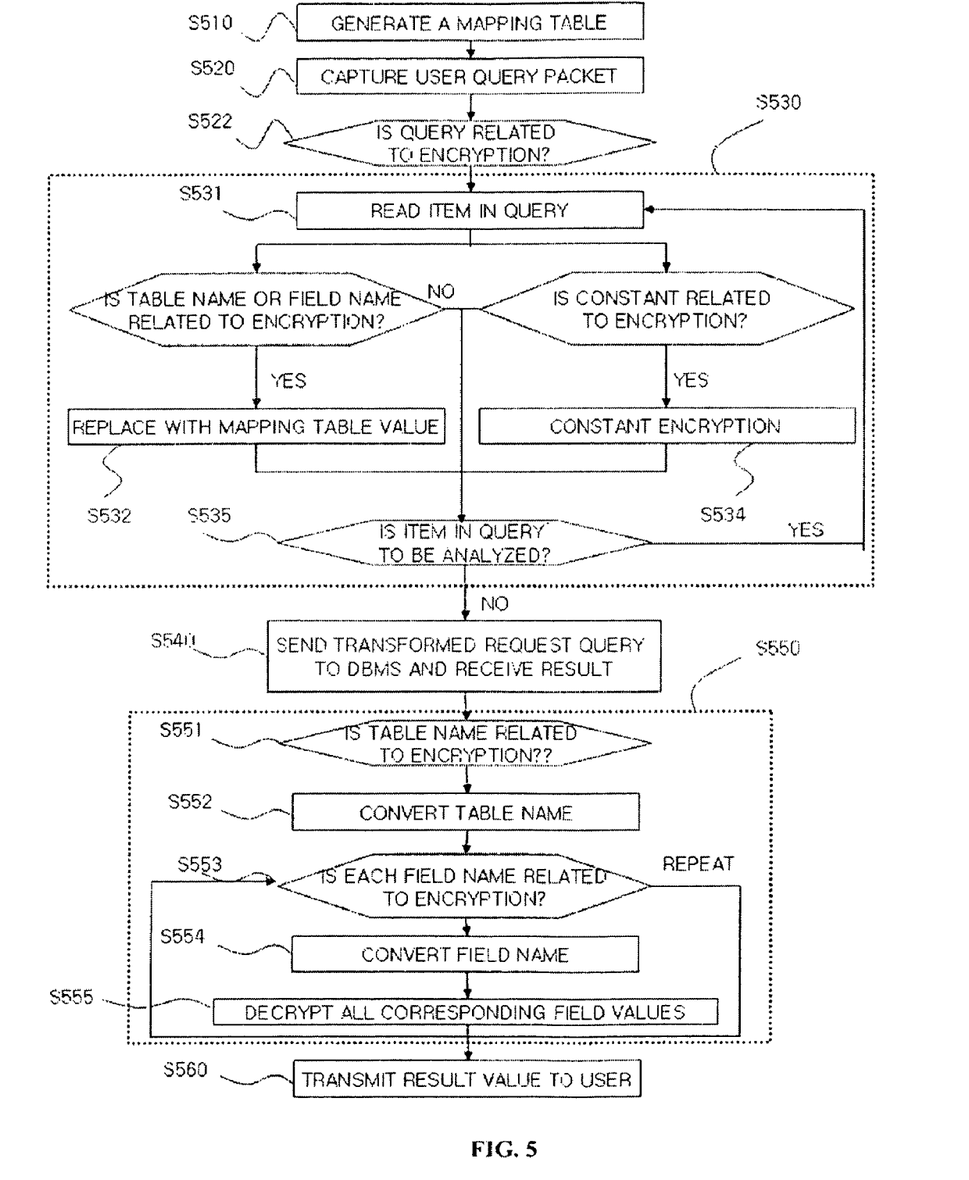
FIG. 5 is a flowchart illustrating an exemplary embodiment of a query pressing method by query transformation according to the invention.

FIG. 5 is a flowchart illustrating an exemplary embodiment of a query processing method by query transformation according to the invention.

The query processing method by query transformation of the invention includes a mapping table generation step (S510) of generating a name mapping table 440, a packet capture step (S520) of capturing (snapping) a query that a user requests from a DBMS, a query transformation step (S530) of transforming the captured, query, a query request step (S540) of requesting a query using the transformed query from the DBMS and receiving a processed result value, a result value transformation step (S550) of transforming the processed result value using the query transformed in the DBMS 100, and a result transmission step (S560) of transmitting or notifying the transformed result value to the user.

In the mapping table generation step (S510), the encryption-related name table 140 of the DBMS 100 is referenced and a name mapping table 440 having the same contents is composed. Here, the encryption-related name table 140 stores table names and field names related to the encrypted table 220 by pairing each original name with its converted name, and the name mapping table 440 is a table that stores the same values read from the encryption-related name table 140 in a DBMS 100. A name existing in the name mapping table 140 indicates that encryption was performed for an item corresponding to the name, and its matching name can also be acquired by mapping.

In the packet capture step (S520), a query which a user requests from the DBMS is captured or snapped. Here, packet is captured since the user is generally connected with the DBMS by networking and thus the query is transmitted in the form of a packet. When the user uses a different form of communication, a different form of the query can be captured. The user composes the query based on a table structure corresponding to the original DB (not encrypted) using a view and the like. Therefore, the query composed by the user, in short, the user query is based on the original DB structure.

The packet capture step (S520) can determine whether or not an encryption-related item exists in the query and selectively call the query processing unit 420 to transform the query. Specifically, the packet capture step (S520) may further include a step of determining, after the query is captured, whether or not an encryption-related item exists in the captured query, and the query transformation step (S530) is enabled when the related item exists. Then, the query processing method may further include a step of sending a query request to the DBMS 100 when the related item does not exist and transmitting the result value to the user. As discussed above, items in the query include query commands and user items such as the table name 611, the file name 612 and the constant 613. The encryption-related item exists when any of the table name 611 or the field name 612 in the query exists in the name mapping table 440. Since these items do not exist in the encrypted DB, they are required to be converted into encrypted items corresponding to the encrypted DB.

Further, the packet capture step (S520) can proceed to the query transformation step (S530) without determining whether or not an item in the query relates to encryption. Determining whether or not an item in the query relates to encryption requires a procedure of reading items in the query in sequence. The procedure of reading items in the query is also performed in the following query transformation step (S530) and thus may be unnecessary in the packet capture step (S520).

The query transformation step (S530) transforms the query by converting or encrypting an encryption-related item in the query, when an encryption-related item is included in the query. As described above, items in the query include query commands and user items such as the table name 611, the file name 612 and the constant 613. The query transformation is performed so as to transform only an encryption-related user item but leave query commands intact. The table name 611 and the field name 612 in the query are determined according to whether or not they exist in the name mapping table 440. When they exist in the name mapping table 440, they are determined to be related to encryption, and their matching names in the name mapping table 440 correspond to the encrypted DB. Hence, the query is transformed by converting it into the matching name(s). A description will be given of a case where the item in the query is the constant 613. The encryption-related constant 613 refers to a constant in an expression related to an encryption-related field name. Conditions in the query and so on are unit relations composed to express relationships such as field name to field name and field name to constant. In the relations expressed by a field name and a constant, constants are related to encryption when the field name is related with encryption. As described above, the relation of the field name to encryption is determined based on whether or not the field name exists in the name mapping table 440.

In more detail, the query transformation step (S530) includes the following steps of: sequentially reading items in the query (S531); converting the table name 611 or the field name 612 into an item value corresponding to encryption when a read item is the table name 611 or a field name 612 and relates to encryption (S532); replacing a constant 613 with a value encrypted by an encryption/decryption method when a read item is the constant 613 and the field name 612 is a variation in a relation including the constant 613 and relates to encryption (S534); determining whether or not a more item to read exists in the query, returning to the item reading step (S531) when a further item to read exists, and proceeding to the query request step (S540) when no further item to read exists.

The query request step (S540) sends the transformed query request to the DBMS and receives a processed result value. Since the transformed query is converted into names corresponding to the table name, the field name and field value, which are already encrypted, or encrypted to constant values, the DBMS can process the request query in the same manner as processing a common query. This means that the DBMS equally processes queries irrespective of encryption.

The result value transformation step (S550) transforms the encryption-related item in the result value, which was processed using the transformed query in the DBMS 100, into a result value corresponding to the original DB by converting or decrypting the encryption-related item. In the result value 710, encryption-related items include the table name 711, the field name 712 and field values 713. The table name 711 is an encryption-related item when its result value is returned in a table form and its table name exists in the name mapping table 440. In this case, the table name 711 is converted to be the same as the matching value in the mapping table 440. The field name 712 is an encryption-related item when its result value is returned in a table form and it exists in the name mapping table 440 after all the field names of the table are checked. In this case, the field name 712 is converted to be the same as the matching value in the mapping table 440, like the table name. When the field name 712 relates to encryption or exists in the mapping table 440, all the field values 713 corresponding to the filed name relate to encryption. Accordingly, all the field values 713 are encrypted and are replaced by the encrypted values. Like the query transformation, those items unrelated to encryption are not transformed. The table composed as above becomes a result value corresponding to the original DB.

In more detail, the result value transformation step (S550) includes the steps of: converting the table name 711, received as the result value, into a table name corresponding to encryption when the table name 711 relates to encryption (S552); determining whether or not the field name 712 of the table name, received as the result value, relates to encryption (S553); converting the field name 712 into a field name corresponding to encryption when the field name 712 relates to encryption (S554); replacing all field values corresponding to the field name by decryption (S555); and determining whether or not respective field name 712 of the table, received as the result value, relates to encryption (S553).

The result transmission step (S560) is a step of notifying the transformed result value to the user. The user is not aware of the encryption process since he/she requests a query based on the original table structure and is informed of the result based on the original table structure. Accordingly, the user is provided with transparency.

As described above, when the packet capture step (S520) selectively performs the query transformation by determining the encryption-related item in the query, those steps from the query transformation step (S530) to the result value transformation step (S550) are performed when the encryption-related items are included in the query. These steps are not performed when the encryption-related items do not exist. Instead, a query request is sent to the DBMS and its result is received therefrom. This is identical to query request procedures of a common DBMS. The result received from the DBMS is notified to the user (S560).

What is claimed is:

1. A query processing method using query transformation when a user requests a first query based on a structure of an original database to a database management system (DBMS) managing a database with at least a column encrypted, the method comprising the steps of:
   (S510) generating a name mapping table when the database management system generates an encryption-related table, wherein the name mapping table stores a field name corresponding to a column to be encrypted and a table name including the column by mapping an original name of the field name or the table name to an encrypted name thereof;
   (S520) capturing the first query that the user requests to the database management;
   (S530) analyzing and transforming the captured first query into a second query capable of referencing an encrypted database, by converting an encryption-related item in the first query using the name mapping table or by encrypting the encryption-related item using an encryption processing unit;
   (S540) requesting the transformed second query to the database management system and receiving a processed result value therefrom; and
   (S550) transforming the result value, processed based on the transformed second query in the DBMS, into a result value corresponding to the original database by converting an encryption-related item therein using the name mapping table or decrypting the encryption-related item using the encryption processing unit; and
   (S560) notifying the transformed result value to the user, wherein the step (S530) comprises the steps of:
   (S531) sequentially reading items in the first query;
   (S532) converting a read item using the name mapping table encryption when the read item is the table name or the field name and relates to encryption;
   (S534) replacing a constant with an encrypted value when the read item is the constant and constitutes a relation of a variable constant that is the field name related to encryption; and
   determining whether or not another item to read exists in the first query, returning to the step (S531) when a further item to read exists, and proceeding to the second query request step (S540) when no further item to read exists, and
   wherein the step (S550) comprises the steps of:
   (S552) converting the table name, included in the result value, using the name mapping table when the table name relates to encryption; and
   (S554) converting the field name, included in the result value, using the name mapping table, and decrypting all field values corresponding to the field name when the field name relates to encryption.

2. The method according to claim 1, wherein the step (532) comprises converting the item read from the first query into a matching value stored in the name mapping table when the read item is the table name or the file name and exists in the name mapping table, and
   wherein the step (S552) or the step (S553) comprises converting the table name or the field name, included in the result value, into a matching value stored in the name mapping table when the table name or the field name exists in the name mapping table.

* * * * *